US012625238B2

(12) United States Patent
Mohan et al.

(10) Patent No.: US 12,625,238 B2
(45) Date of Patent: May 12, 2026

(54) TIME-OF-FLIGHT SENSING CIRCUITRY, TIME-OF-FLIGHT IMAGING PORTION, SIGNAL PROCESSING METHOD

(71) Applicant: Sony Semiconductor Solutions Corporation, Kanagawa (JP)

(72) Inventors: Rachit Mohan, Stuttgart (DE); Ward Van Der Tempel, Muizen (BE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1066 days.

(21) Appl. No.: 17/637,423

(22) PCT Filed: Aug. 27, 2020

(86) PCT No.: PCT/EP2020/073947
§ 371 (c)(1),
(2) Date: Feb. 22, 2022

(87) PCT Pub. No.: WO2021/037964
PCT Pub. Date: Mar. 4, 2021

(65) Prior Publication Data
US 2022/0276361 A1 Sep. 1, 2022

(30) Foreign Application Priority Data

Aug. 29, 2019 (EP) ..................................... 19194246

(51) Int. Cl.
G01S 7/4915 (2020.01)
G01S 7/4914 (2020.01)
(Continued)

(52) U.S. Cl.
CPC .......... G01S 7/4915 (2013.01); G01S 7/4914 (2013.01); G01S 17/36 (2013.01); G01S 17/894 (2020.01)

(58) Field of Classification Search
CPC .............................. G01S 17/36; G01S 7/4915
See application file for complete search history.

(56) References Cited

U.S. PATENT DOCUMENTS 6,660,989 B2 12/2003 Guo et al.
6,977,685 B1 12/2005 Acosta-Serafini et al.
(Continued)

FOREIGN PATENT DOCUMENTS

EP 2 504 993 A1 1/2016
WO WO 2011/064532 A1 6/2011

OTHER PUBLICATIONS

V. Ravinuthula et al., "Time-mode Circuits For Analog Computation," International Journal of Circuit Theory and Applications, vol. 37, No. 5, pp. 631-659, Wiley, Jun. 2009. (Year: 2009).*
(Continued)

*Primary Examiner* — Yuqing Xiao
*Assistant Examiner* — Zhengqing Qi
(74) *Attorney, Agent, or Firm* — Wolf, Greenfield & Sacks, P.C.

(57) ABSTRACT

The present disclosure generally pertains to a time-of-flight sensing circuitry configured to: • determine a first point of time, at which a first voltage signal (6) reaches a predetermined threshold (4); • determine a second point of time, at which a second voltage signal (7) reaches the predetermined threshold (4); and • determine a phase shift of detected light on the basis of a voltage difference between the first and the second voltage signal based on a time difference of the second point of time and the first point of time.

20 Claims, 5 Drawing Sheets

(51) Int. Cl.
   *G01S 17/36*    (2006.01)
   *G01S 17/894*   (2020.01)

(56)                References Cited

U.S. PATENT DOCUMENTS

| | | | |
|---|---|---|---|
| 2003/0107666 A1 | 6/2003 | Harton et al. | |
| 2011/0164132 A1* | 7/2011 | Buettgen | G01S 17/36 |
| | | | 348/135 |
| 2015/0356747 A1* | 12/2015 | Dielacher | G06T 7/70 |
| | | | 348/142 |
| 2016/0182847 A1* | 6/2016 | Wan | H04N 13/271 |
| | | | 250/206 |
| 2020/0295060 A1* | 9/2020 | Ben Shem | H10F 39/80 |
| 2020/0349728 A1* | 11/2020 | Bitan | H04N 5/2226 |

OTHER PUBLICATIONS

Jang et al., "Design of Indirect Time-of-Flight Based Lidar for Precise Three-Dimensional Measurement Under Various Reflection Conditions," SENSORDEVICES 2013 : The Fourth International Conference on Sensor Device Technologies and Applications, pp. 25-29, Aug. 2013. (Year: 2013).*

International Search Report and Written Opinion mailed Nov. 18, 2020 in connection with International Application No. PCT/EP2020/073947.

Campos et al., A multisampling time-domain CMOS imager with synchronous readout circuit. SBCCI Sep. 2007 7 pages.

Cho et al., High fill factor low-voltage CMOS image sensor based on time-to-threshold PWM VLSI architecture. IEEE transactions on very large scale integration (vlsi) systems. Aug. 27, 2013;22(7):1548-56.

* cited by examiner

120

Determine first point of time 121

Determine second point of time 122

Determine phase shift 123

130

Compare first voltage signal and thresold 131

Determine first point of time 132

Compare second voltage signal and thresold 133

Determine second point of time 134

140

170

TIME-OF-FLIGHT SENSING CIRCUITRY, TIME-OF-FLIGHT IMAGING PORTION, SIGNAL PROCESSING METHOD

CROSS REFERENCE TO RELATED APPLICATIONS

This Application is a national stage filing under 35 U.S.C. 371 of International Patent Application Serial No. PCT/EP/2020/073947, filed Aug. 27, 2020 which claims the foreign priority benefits under 35 U.S.C. § 119(a)-(d) or 35 U.S.C. § 365(b) of European application number 19194246.5, filed Aug. 29, 2019. The entire contents of these applications are incorporated herein by reference in their entirety.

TECHNICAL FIELD

The present disclosure generally pertains to a time-of-flight sensing circuitry, a time-of-flight imaging portion, and a signal processing method.

TECHNICAL BACKGROUND

Generally, time-of-flight (ToF) devices for determining a distance to a scene are known. It can be distinguished between direct ToF (dToF), wherein a distance information is acquired based on the run-time of emitted and reflected light, and indirect ToF (iToF), wherein a distance information is acquired based on a phase-shift of emitted and reflected light.

In the case of iToF, the phase-shift is typically determined based on a measured pixel voltage at least at two locations within predetermined shifted time-windows, wherein the locations are typically transistor gates.

This known way of determining the phase-shift, and thereby, the distance information, is known to be limited in that a dynamic range, which is generally known, is limited with the maximum pixel voltage (e.g. 1 Volt).

Although there exist techniques for increasing a dynamic range, it is generally desirable to provide a ToF sensing circuitry, a ToF imaging portion, and a signal processing method.

SUMMARY

According to a first aspect the disclosure provides a time-of-flight sensing circuitry configured to: determine a first point of time, at which a first voltage signal reaches a predetermined threshold; determine a second point of time, at which a second voltage signal reaches the predetermined threshold; and determine a phase shift of detected light on the basis of a voltage difference between the first and the second voltage signal based on a time difference of the second point of time and the first point of time.

According to a second aspect, the disclosure provides a time-of-flight imaging portion, comprising: a time-of-flight signaling circuitry including a first transfer gate and a second transfer gate; and a time-of-flight sensing circuitry configured to: determine a first point of time, at which a first voltage signal reaches a predetermined threshold; determine a second point of time, at which a second voltage signal reaches the predetermined threshold; and determine a phase shift of detected light on the basis of a voltage difference between the first and the second voltage signal based on a time difference of the second point of time and the first point of time.

According to a third aspect, the disclosure provides a signal processing method comprising: determining a first point of time, at which a first voltage signal reaches a predetermined threshold; determining a second point of time, at which a second voltage signal reaches the predetermined threshold; and determining a phase shift of detected light on the basis of a voltage difference between the first and the second voltage signal based on a time difference of the second point of time and the first point of time.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 3:
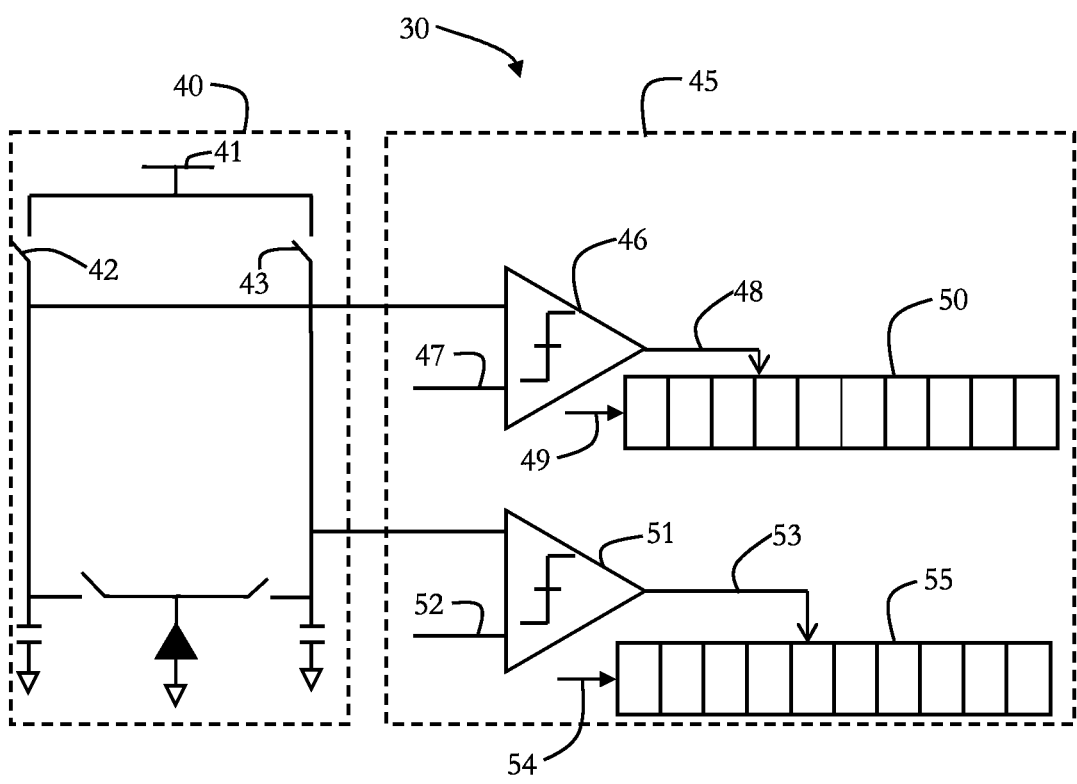
FIG. 3 depicts a schematic diagram of a ToF imaging portion according to the present disclosure.

Before a detailed description of the embodiments under reference of FIG. 3 is given, general explanations are made.

As mentioned in the outset, it is generally desirable to increase a dynamic range in a ToF measurement, for example to account for offsets, ambient light, object distance, object reflectivity, specular reflection, e.g. to obtain a differential reflected signal, and the like.

It has been recognized that known ToF devices have an insufficient dynamic range, since a voltage offset in a pixel is typically in the range of the pixel voltage itself.

Thus, in order to increase the dynamic range, one may envisage to increase the pixel voltage, which, however, leads to a high power consumption, whereas it is desirable to decrease or at least avoid a rise in power consumption.

Moreover, it has been recognized that current ToF systems determining the phase shift in the voltage domain, as it is generally known, may be at least one of power-inefficient (as discussed) and/or area-inefficient due to a limitation in the measuring range.

Also, such systems typically require chip-to-chip connections, whereas it is generally desirable to reduce complexity in ToF devices.

Therefore, some embodiments pertain to a time-of-flight sensing circuitry configured to: determine a first point of time, at which a first voltage signal reaches a predetermined threshold; determine a second point of time, at which a second voltage signal reaches the predetermined threshold; and determine a phase shift of detected light on the basis of a voltage difference between the first and the second voltage signal based on a time difference of the second point of time and the first point of time.

The time-of-flight sensing circuitry may be any circuitry configured to perform, read out, sample, process, and the like, time-of-flight (ToF) measurements. The ToF sensing circuitry may be implemented by a processor, integrated circuit, microcontroller, FPGA (field programmable gate array), and the like.

The first (or second) point of time may be any point of time within the ToF measurement after a start of an acquisition (e.g. a detection of light). Generally, the second point of time may be after the first point of time, but in some embodiments it may be (roughly) equal to the first point of time or before the first point of time.

The first point of time may be a point of time at which a first voltage signal reaches a predetermined threshold.

The first (second) voltage signal may be a signal detected by, measured by or provided to the ToF sensing circuitry.

For example, the ToF sensing circuitry may include detection means to detect the first (second) voltage signal generated outside of the ToF sensing circuitry or the first (second) voltage signal may be generated within the ToF sensing circuitry and, thus, the ToF sensing circuitry may include further detection circuitry to detect the first (second) voltage signal.

In some embodiments, however, the first voltage signal (and the second voltage signal, as well) may be provided to the ToF sensing circuitry, e.g. as a digital signal e.g. from a storage, from transfer gates of a ToF imaging element (e.g. a pixel) and the like, such that the ToF sensing circuitry processes and evaluates the first (and the second) voltage signal.

In some embodiments, the first voltage signal may be detected by the ToF sensing circuitry and the second voltage signal may be provided to the ToF sensing circuitry, or vice versa.

The predetermined threshold may be a voltage level, which may be compared to the first and/or the second voltage signal, such that the first and/or the second point of time can be determined within a certain time interval, which may be based on a sampling rate, an imaging rate, a frame rate, and the like.

The predetermined threshold may be (pre-)defined or dynamically set based on the first and/or the second voltage signal. The setting may be based on the slope of the first and/or the second voltage signal, such that the time, in which the first and/or the second voltage signal, and thereby the first point of time and the second point of time, are determined, is below or equal to a predetermined time value, which may be based on a sampling rate, an imaging rate, a frame rate, and the like.

The predetermined threshold may be a static voltage level, such that the voltage level to which the first voltage signal is compared to is the same as the second voltage level is compared to.

However, the voltage level to which the first voltage signal is compared to may be different from the voltage level to which the second voltage signal is compared to. For example, the predetermined threshold may be a voltage ramp, such that the predetermined threshold is increasing over time, such that the first voltage signal may be compared to a lower voltage level than the second voltage signal.

Hence, the predetermined threshold may be based on a variable comparison voltage level.

Additionally, the predetermined threshold may correspond to at least two voltage levels to which the first and second voltage signal are respectively compared to (which may be different or the same voltage levels).

In some embodiments, the phase shift, which is generally known in the field of ToF for determining a distance (e.g. in iToF), is determined based on a voltage difference of the first voltage signal and the second voltage signal, wherein the voltage difference is based on the time difference of the second point of time and the first point of time.

For example, when the first and second point of time are determined based on the comparison of the first and second voltage signal and the predetermined threshold, the voltage difference can be determined when the predetermined threshold (or voltage levels) and at least one point (additional to a starting point) of the first voltage signal and at least one point (additional to a starting point) of the second voltage signal is known.

Thus, a progression, a graph, and the like, for each of the first and the second voltage signal can be (symbolically) reconstructed and the voltage difference can be determined.

In some embodiments, the voltage difference is determined for the same point of time.

For example, the first point of time is determined as discussed herein, and the second point of time is reconstructed from the first point of time, without limiting the present disclosure in that regard.

In some embodiments, the voltage difference may be determined for different points of time and may, moreover, depend on the predetermined threshold.

For example, the predetermined threshold may be a voltage ramp and, thus, it may be sufficient to determine the voltage difference for the start of the voltage ramp and for the end of the voltage ramp.

As discussed, the present disclosure is not limited to the predetermined threshold being a ramp signal or a constant voltage.

Hence, in some embodiments the predetermined threshold is a function.

It may be any function of a voltage signal over time (or a voltage signal progression, i.e. the present disclosure is not limited to the function being a strict function in the mathematical sense, since, as mentioned above, the predetermined threshold may correspond to two different voltage levels, i.e. points on a (symbolic) coordinate system).

In some embodiments the first voltage signal is representative of a sampling of a first transfer gate and the second voltage signal is representative of a sampling of a second transfer gate.

The first and the second transfer gate may be gates of a transistor coupled to an imaging element to read out electric charge.

As discussed above, the imaging element and the transfer gates are not necessarily included in the ToF sensing circuitry, but the ToF sensing circuitry may be configured to evaluate the signals (first and second voltage signal) provided via the first and the second transfer gate.

In some embodiments, the ToF sensing circuitry further includes: a first comparator configured to compare the first voltage signal and the predetermined threshold; a first clock associated with the first comparator, such that the first point of time is determined based on the comparison of the first voltage signal and the predetermined threshold; a second comparator configured to compare the second voltage signal and the predetermined threshold, a second clock associated with the second comparator, such that the second point of time is determined based on the comparison of the second voltage signal and the predetermined threshold.

The first and/or the second comparator may perform correlated double sampling (CDS) in order to compare the first/second voltage signal with the predetermined threshold.

The first and/or the second clock (or clock generator) may provide a clock signal for determining the first/second point of time.

In some embodiments, the voltage difference is determined for the first point of time, as already discussed above.

In some embodiments, the voltage difference is further determined based on an extrapolation of the second voltage signal at the second point of time, thereby determining a value of the second voltage signal at the first point of time, as discussed above.

Figure 1:
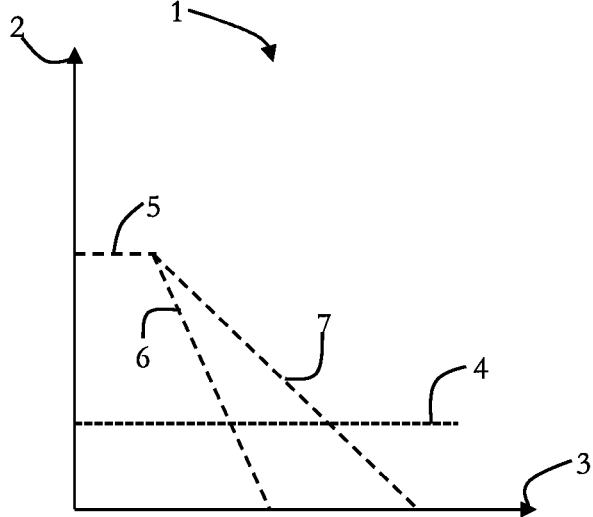
FIG. 1 shows a coordinate system including voltage signals according to the present disclosure.

In some embodiments, the first voltage signal and the second voltage signal can be symbolically depicted as graphs, as shown in FIG. 1, which shows a coordinate system 1 with an ordinate 2 including a voltage and an abscissa 3 including a time.

Moreover, a threshold voltage 4 (predetermined threshold) and a reset voltage 5 corresponding to an initial voltage of a ToF imaging element (e.g. pixel) are depicted.

The reset voltage is achieved, for example, with an auto-zeroing element (e.g. an analog memory; not depicted), such that initial noise and offset (e.g. from a previous measurement) may be removed.

The reset voltage 5 is being reduced (in some embodiments, increased) by a sampling of two transfer gates Tap A and Tap B, wherein the dashed line 6 corresponds to the determined (first) voltage signal of Tap A and the dashed line 7 corresponds to the determined (second) voltage signal of Tap B.

As can be taken from FIG. 1, the dashed lines 6 and 7 may decrease with a ramp slope which may be proportional to the total illumination intensity of detected light, without limiting the present disclosure in that regard.

The first point of time corresponds to the time at which the dashed line 6 intersects the threshold voltage 4 and the second point of time corresponds to the time at which the dashed line 7 intersects the threshold voltage 4.

The first point of time and the second point of time may each be representative of an illumination intensity, i.e. of detected light.

Generally, the time at which the sampling starts, i.e. when the reset voltage is split up in the dashed lines 6 and 7, is known, and the times of intersections of the two dashed lines 6 and 7 are measured (e.g. with a comparator and a clock, as discussed herein), such that every point of the two dashed lines 6 and 7 can be reconstructed (e.g. by interpolation or extrapolation, as discussed herein).

Hence, the voltage level of Tap B (i.e. the dashed line 7) can be reconstructed at the first point of time, and a voltage difference of Tap A and Tap B can be determined at the first point of time.

In some embodiments, the voltage difference is, thus, based on the formula:

$$V = V_{threshold}\left(1 - \frac{t_1}{t_2}\right),$$

wherein V is the voltage difference, $V_{threshold}$ is a voltage level at the predetermined threshold, $t_1$ is the first point of time and $t_2$ is the second point of time.

Some embodiments pertain to a time-of-flight imaging portion, including: a time-of-flight signaling circuitry including a first transfer gate and a second transfer gate; and a time-of-flight sensing circuitry configured to: determine a first point of time, at which a first voltage signal reaches a predetermined threshold; determine a second point of time, at which a second voltage signal reaches the predetermined threshold; and determine a phase shift of detected light on the basis of a time difference of the second point of time and the first point of time based on a voltage difference between the first and the second voltage signal, as discussed herein.

The time-of-flight imaging portion may correspond to a pixel and may be configured to process and perform a ToF measurement by itself or form part of a pixel, such that, for example, it is configured to be provided by a photoelectric signal generated in the pixel and process this signal, and the like.

In some embodiments, the predetermined threshold is a function, as discussed herein.

In some embodiments, the first voltage signal is generated in response to a sampling of the first transfer gate and the second voltage signal is generated in response to a sampling of the second transfer gate.

The sampling may correspond to a readout of a voltage signal at the first transfer gate (or Tap A) and of the voltage signal at the second transfer gate (or Tap B) with a predetermined sampling frequency, and the like.

In some embodiments, the voltage difference is determined for the first point of time, as discussed herein. In some embodiments, the voltage difference is further determined based on an extrapolation of the second voltage signal at the second point of time, thereby determining a voltage of the second voltage signal at the first point of time, as discussed herein.

In some embodiments, one time-of-flight signaling circuitry is associated with one time-of-flight sensing circuitry, such that a plurality of ToF imaging portions may be arranged in an array, in a pattern, in a row, and the like, to form, for example, a ToF image sensor having a per pixel read out.

The association may be a direct coupling (electric connection) between a single ToF sensing circuitry and a single ToF signaling circuitry, but the present disclosure is not limited in that regard, such that the association may be indirect. For example, the ToF sensing circuitry and the ToF signaling circuitry may be provided on different chips, printed circuit boards, and the like.

In some embodiments, one ToF sensing circuitry is associated with a group of ToF signaling circuitries, such that the single ToF sensing circuitry is configured to evaluate the signals of (each of) the group of ToF sensing circuitries, and the association may be, as discussed above, direct or indirect.

Some embodiments pertain to a signal processing method including: determining a first point of time, at which a first voltage signal reaches a predetermined threshold; determining a second point of time, at which a second voltage signal reaches the predetermined threshold; and determining a phase shift of detected light on the basis of a time difference of the second point of time and the first point of time based on a voltage difference between the first and the second voltage signal, as discussed herein.

The signal processing method may be performed with a ToF sensing circuitry, as discussed herein, a ToF imaging portion, as discussed herein, a processor (or multiple processors), an FPGA, a plurality and/or combinations thereof, and the like.

In some embodiments the predetermined threshold is a function, as discussed herein. In some embodiments, the first voltage signal is representative of a sampling of a first transfer gate and the second voltage signal is representative of a sampling of a second transfer gate, as discussed herein. In some embodiments, the signal processing method, further includes: comparing the first voltage signal and the predetermined threshold; determining the first point of time based on the comparison of the first voltage signal and the predetermined threshold; comparing the second voltage signal and the predetermined threshold; and determining the second point of time based on the comparison of the second voltage signal and predetermined threshold, as discussed herein. In some embodiments, the voltage difference is determined for the first point of time. In some embodiments, the signal processing method, further includes: extrapolating the second voltage signal at the second point of time; and thereby determining a value of the second voltage signal at the first point of time. In some embodiments, the voltage difference is based on the formula:

$$V = V_{threshold}\left(1 - \frac{t_1}{t_2}\right),$$

wherein V is the voltage difference, $V_{threshold}$ is a voltage level at the predetermined threshold, $t_1$ is the first point of time and $t_2$ is the second point of time, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Figure 2:
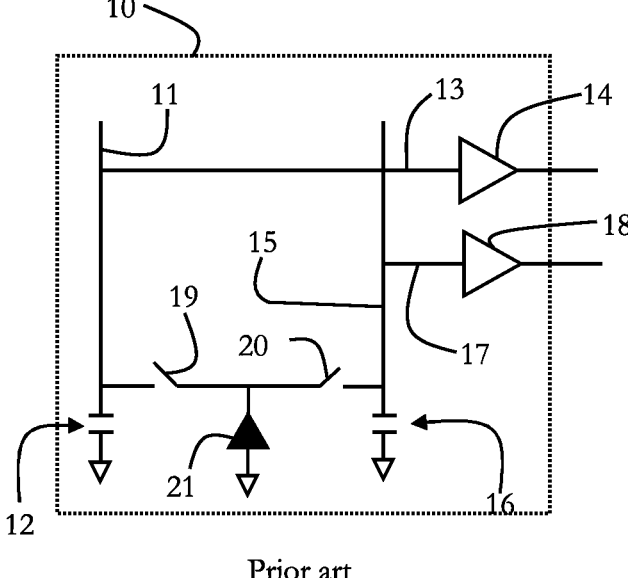
FIG. 2 depicts a schematic diagram of a ToF pixel, as it is generally known.

FIG. 2 depicts a schematic diagram of a ToF pixel 10, as it is generally known

The pixel 10 includes a first voltage line 11 being coupled to a first transfer gate (Tap A) (not depicted). The first voltage line 11 is coupled to a first capacitor 12 being charged in response to a sampling of Tap A (in other embodiments, the capacitor is discharged). Moreover, a first voltage signal of the first voltage line 11, and thereby the first transfer gate, is read out by a first measuring line 13, which includes a first A/D (analog to digital) converter 14, which is configured to convert the first voltage signal into a digital signal.

The pixel 10 further includes a second voltage line 15 being coupled to a second transfer gate (Tap B) (not depicted). The second voltage line 15 is coupled to a second capacitor 16 being charged (or discharged) in response to a sampling of Tap B. Moreover, a second voltage signal of the second voltage line 15, and thereby the second transfer gate, is read out by a second measuring line 17, which includes a second A/D converter 18, which is configured to convert the second voltage signal into a digital signal.

Moreover, the pixel 10 includes two switches 19 and 20, which can be brought into a closed state for either mixing the signals (when both switches are in the closed state) and further processing of the mixed signal or for a further processing of the single signals via an operator 21.

The operator 21 may be a (half) intelligent element configured to process any (or all) of the signals.

The digitalized voltage signals are processed, as it is generally known, for determining phase information in a voltage domain.

However, as discussed, in such embodiments, a dynamic range is limited by the maximum voltage of the pixel.

Therefore, as shown in FIG. 3, the signals of Tap A and Tap B are transformed into the time domain in accordance with the present disclosure, which provides that the dynamic range is not depending on the pixel voltage, but on the clock frequency, such that it may be generally higher than in embodiments, in which the phase is determined in the voltage domain.

FIG. 3 generally depicts a schematic diagram of a ToF imaging portion 30 according to the present disclosure.

The ToF imaging portion 30 includes a ToF signaling circuitry 40 and a ToF sensing circuitry 45.

The ToF signaling circuitry 40 is similar to the prior art ToF pixel 10 discussed with respect to FIG. 2 and therefore, a repetitive description of components of the ToF signaling circuitry is omitted.

However, in contrast to the ToF pixel 10, for the ToF signaling circuitry 40, in this embodiment, there is no need to include the A/D converters 14 and 18.

Moreover, the ToF signaling circuitry 40 includes a source voltage VDD 41 and two switches 42 and 43, both configured to reset the the ToF signaling circuitry to the source voltage VDD in a closed state.

The ToF sensing circuitry 45 includes a first comparator 46, which compares the first voltage signal of Tap A to a first reference signal 47 (the predetermined threshold discussed herein), and thereby generates a first comparison signal 48 at a first point of time, at which the first voltage signal is roughly equal to the first reference signal (i.e. when the first voltage signal reaches the predetermined threshold).

The first point of time is determined according to a first clock signal 49 provided by a first clock (not depicted), which toggles when the first voltage signal reaches the predetermined threshold and the first point of time is measured by a first digital counter 50.

The ToF sensing circuitry 45 further includes a second comparator 51, which compares the second voltage signal of Tap B to a second reference signal 52 (the predetermined threshold), and thereby generates a second comparison signal 53 at a second point of time, at which the second voltage signal is roughly equal to the second reference signal (i.e. when the second voltage signal reaches the predetermined threshold).

The second point of time is determined according to a second clock signal 54 provided by a second clock (not depicted), which toggles when the second voltage signal reaches the predetermined threshold and the first point of time is measured by a second digital counter 55.

In this embodiment, the digital counters are implemented in the ToF sensing circuitry. However, the present disclosure is not limited in that regard, and the digital counter may be provided (in the case of a stacked image sensor) in another semiconductor substrate (e.g. silicon layer).

In the following, an exemplary workflow of the ToF imaging portion is described, exemplarily for the upper comparator circuitry (reference signs 46 to 50), but also applicable to the lower comparator circuitry (reference signs 51 to 55).

When the reset voltage is applied, the first reference signal is connected to a reference ramp signal, wherein the digital counter is configured to begin counting at roughly the same time as the reset voltage is applied and stops counting when the comparator toggles, such that the counter value is to read out.

During an exposure (i.e. a detection of light), the first reference signal is connected to a constant threshold voltage and the digital counter is reset.

Thereby, the dynamic range is not limited by the pixel voltage (in this embodiment the reset voltage), but by the clock frequency, such that a dynamic range can be achieved which is higher than the dynamic range in the case of the voltage based operation as discussed with respect to FIG. 2.

Figure 4:
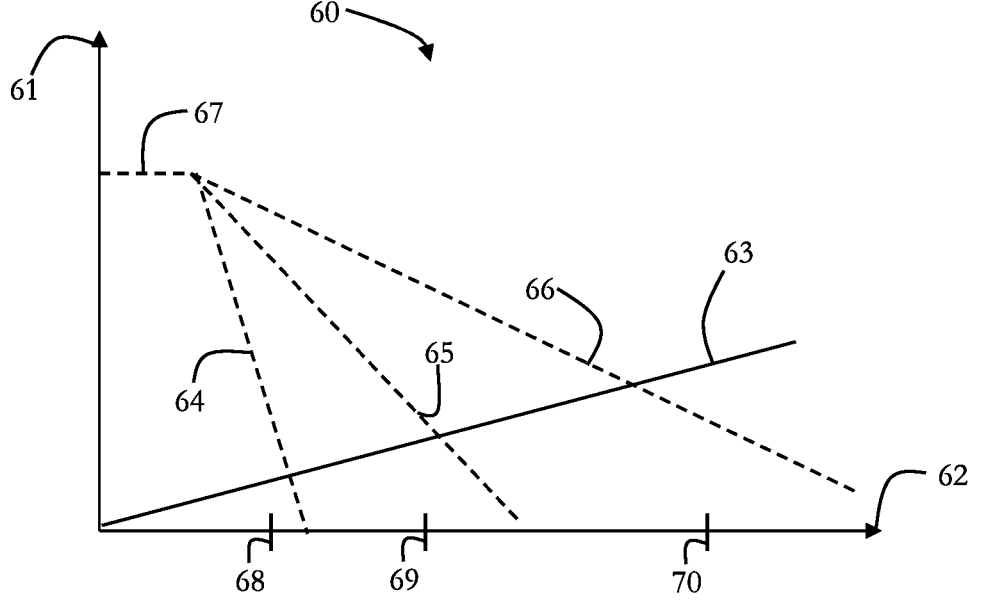
FIG. 4 depicts, in a coordinate system, an embodiment of a predetermined threshold according to the present disclosure.

FIG. 4 depicts a coordinate system 60 which represents, on an ordinate 61, a voltage level, and, on the abscissa 62, a time.

Furthermore, a predetermined threshold 63 is shown which intersects with three voltage signals 64, 65, and 66 each decreasing from a reset voltage level 67.

The first voltage signal 64 represents the voltage of Tap A, as discussed herein, the second voltage signal 65 represents the voltage of Tap B, as discussed herein, and the third voltage 66 signal represents the source voltage VDD (deriving e.g. from a pixel).

Moreover, three points of time 68, 69, and 70 are determined, which, in this embodiment, do not correspond to the points of time of the respective intersection of the voltage signals 64 to 66 with the predetermined threshold 63, such that, in such embodiments, the voltage difference can be determined based on a specific configuration of at least one of the comparators and/or the clocks.

Figure 5:
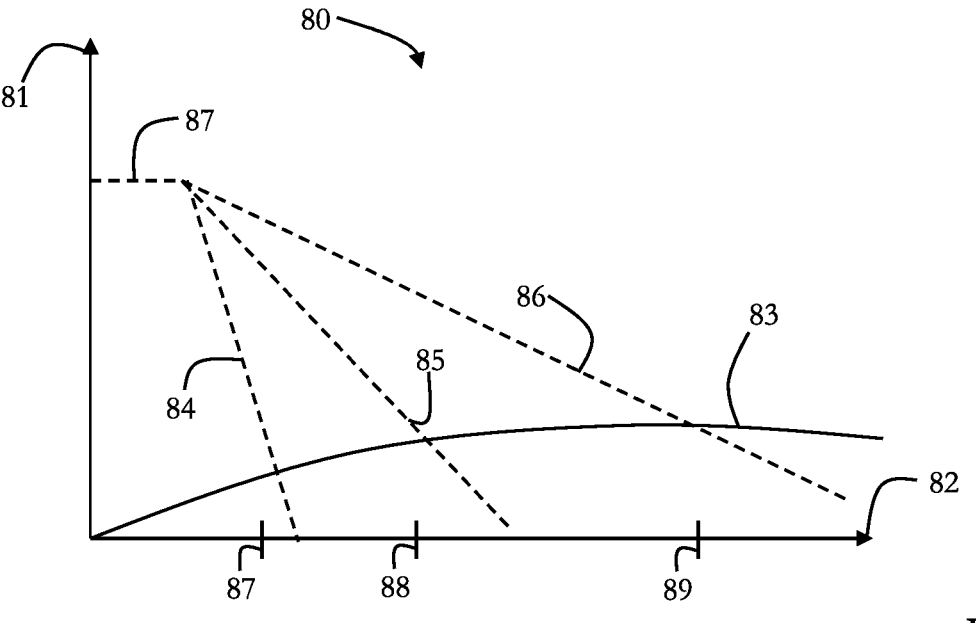
FIG. 5 depicts, in a coordinate system, a further embodiment of a predetermined threshold according to the present disclosure.

FIG. 5 depicts a coordinate system 80 which represents, on an ordinate 81, a voltage level, and, on the abscissa 82, a time.

Furthermore, a predetermined threshold 83 is shown which intersects with three voltage signals 84, 85, and 86 each decreasing from a reset voltage level 87.

The first voltage signal 84 represents the voltage of Tap A, as discussed herein, the second voltage signal 85 represents the voltage of Tap B, as discussed herein, and the third voltage 86 signal represents the source voltage VDD (deriving e.g. from a pixel).

Moreover, three points of time 88, 89, and 90 are determined, which, in this embodiment, do not correspond to the points of time of the respective intersection of the voltage signals 84 to 86 with the predetermined threshold 83, such that, in such embodiments, the voltage difference can be determined based on a specific configuration of one of the comparators and/or the clocks.

Figure 6:
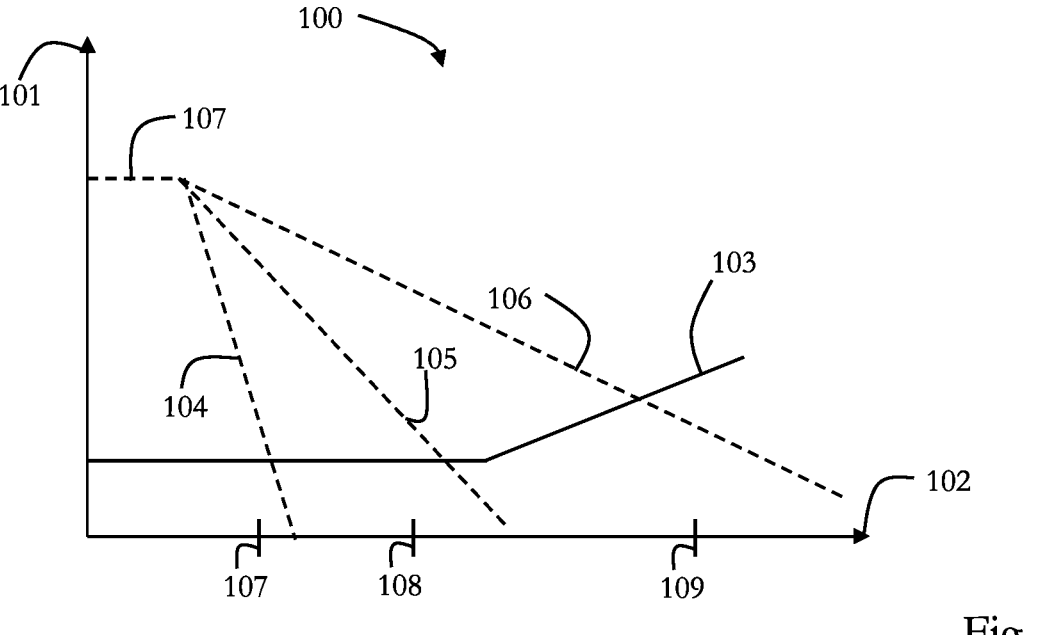
FIG. 6 depicts, in a coordinate system, a further embodiment of a predetermined threshold according to the present disclosure.

FIG. 6 depicts a coordinate system 100 which represents, on an ordinate 101, a voltage level, and, on the abscissa 102, a time.

Furthermore, a predetermined threshold 103 is shown which intersects with three voltage signals 104, 105, and 106 each decreasing from a reset voltage level 107.

The first voltage signal 104 represents the voltage of Tap A, as discussed herein, the second voltage signal 105 represents the voltage of Tap B, as discussed herein, and the third voltage 106 signal represents the source voltage VDD (deriving e.g. from a pixel).

Moreover, three points of time 108, 109, and 110 are determined, which, in this embodiment, do not correspond to the points of time of the respective intersection of the voltage signals 104 to 106 with the predetermined threshold 103, such that, in such embodiments, the voltage difference can be determined based on a specific configuration of one of the comparators and/or the clocks.

Generally, the predetermined threshold is not limited to a specific shape, such as the shape shown in FIG. 1 or 4 to 6, and it may be any function or a set of points, as already discussed above.

Figure 7:
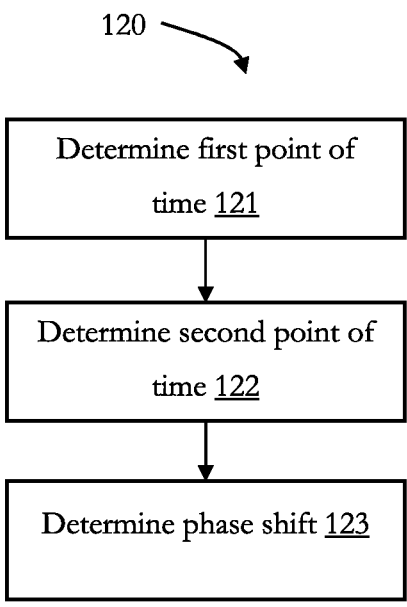
FIG. 7 depicts, in a block diagram, a method according to the present disclosure.

FIG. 7 depicts, in a block diagram, a method 120 according to the present disclosure, which may be performed by a ToF sensing circuitry and/or a ToF imaging portion according to the present disclosure.

In 121, a first point of time is determined at which a first voltage signal reaches a predetermined threshold, as discussed herein.

In 122, a second point of time is determined at which a second voltage signal reaches the predetermined threshold, as discussed herein.

In 123, a phase shift of detected light is determined on the basis of a voltage difference between the first and the second voltage signal based on a time difference of the second point of time and the first point of time, as discussed herein.

Figure 8:
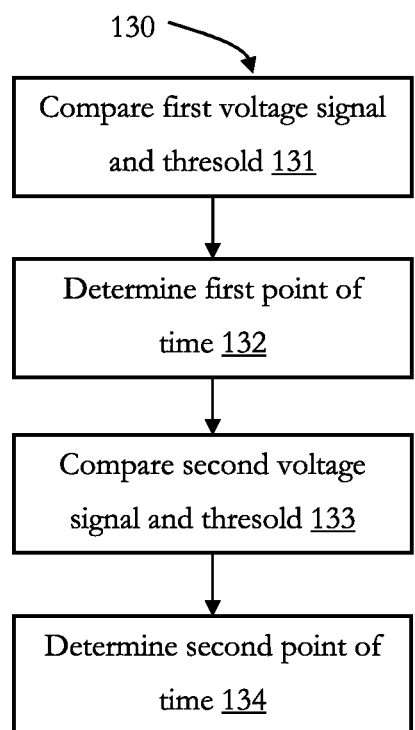
FIG. 8 depicts a block diagram of a further method according to the present disclosure.

FIG. 8 shows a block diagram of a method 130 according to the present disclosure, which may be performed by a ToF sensing circuitry and/or a ToF imaging portion according to the present disclosure.

In 131, the first voltage signal and the predetermined threshold are compared, as discussed herein.

In 132, the first point of time is determined based on the comparison of 131.

In 133, the second voltage signal and the predetermined threshold are compared, as discussed herein, In 134, the second point of time is determined based on the comparison of 133.

Figure 9:
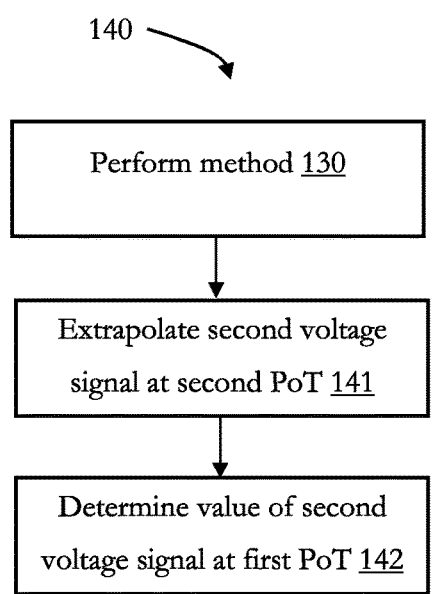
FIG. 9 depicts a block diagram of a further method according to the present disclosure.

FIG. 9 depicts a block diagram of a method 140 according to the present disclosure, which is based on the method 130 and which may be performed by a ToF sensing circuitry and/or a ToF imaging portion according to the present disclosure.

In 141, the second voltage signal is extrapolated at the second point of time (PoT), whereby, in 142, a value of the second voltage signal at the first point of time is determined.

Figure 10:
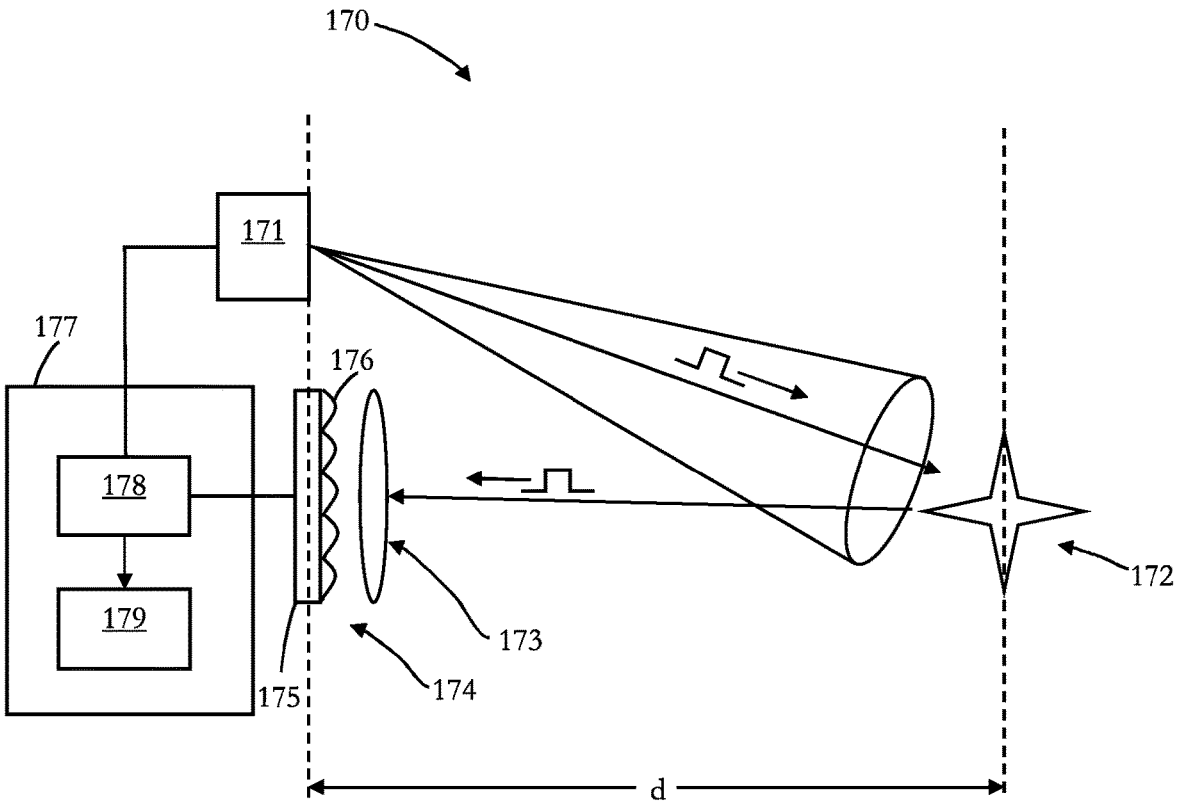
FIG. 10 depicts a block diagram an embodiment of a ToF imaging apparatus.

Referring to FIG. 10, there is illustrated an embodiment of a time-of-flight (ToF) imaging apparatus 170, which can be used for depth sensing or providing a distance measurement, in particular for the technology as discussed herein, wherein the ToF imaging apparatus 170 is configured as an iToF camera. The ToF imaging apparatus 170 has a control 177, which is configured to perform the methods as discussed herein and which forms a control of the ToF imaging apparatus 170 (and it includes, not shown, corresponding processors, memory and storage, as it is generally known to the skilled person).

The ToF imaging apparatus 170 has a pulsed (modulated) light source 171 and it includes light emitting elements (based on laser diodes), wherein in the present embodiment, the light emitting elements are narrow band laser elements.

The light source 171 emits light, i.e. modulated light, as discussed herein, to a scene 172 (region of interest or object), which reflects the light. The reflected light is focused by an optical stack 173 to a light detector 174.

The light detector 174 has a photo detection portion, which is implemented based on multiple CAPDs formed in an array of pixels and a micro lens array 176 which focuses the light reflected from the scene 172 to the photo detection portion 175 (to each pixel of the image sensor 175).

The light emission time and modulation information is fed to the control 177 including a time-of-flight measurement unit 178, which also receives respective information from the photo detection portion 175, when the light is detected which is reflected from the scene 172. On the basis of the modulated light received from the light source 171 and the first voltage signal and the second voltage signal, the time-of-flight measurement unit 178 computes a phase shift of the received modulated light which has been emitted from the light source 171 and reflected by the scene 172 and on the basis thereon it computes a distance d (depth information) between the image sensor 175 and the scene 172.

Moreover, the control 177 includes a ToF sensing circuitry and a ToF imaging portion according to the present disclosure, which are configured to perform the methods discussed herein.

The depth information is fed from the time-of-flight measurement unit 178 to a 3D image reconstruction unit 179 of the control 177, which reconstructs (generates) a 3D image of the scene 172 based on the depth information received from the time-of-flight measurement unit 178.

It should be recognized that the embodiments describe methods with an exemplary ordering of method steps. The specific ordering of method steps is however given for illustrative purposes only and should not be construed as binding. For example the ordering of 121 and 122 in the embodiment of FIG. 7 may be exchanged. Also, the ordering of 131, 132 and 133 in the embodiment of FIG. 8 may be exchanged. Further, also the ordering of 132 and 134 in the embodiment of FIG. 8 may be exchanged. Other changes of the ordering of method steps may be apparent to the skilled person.

Please note that the division of the ToF sensing circuitry 50 into units 51 to 57 is only made for illustration purposes and that the present disclosure is not limited to any specific division of functions in specific units. For instance, the ToF sensing circuitry 50 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A time-of-flight sensing circuitry configured to:
   determine a first point of time, at which a first voltage signal reaches a predetermined threshold;
   determine a second point of time, at which a second voltage signal reaches the predetermined threshold; and
   determine a phase shift of detected light on the basis of a voltage difference between the first and the second voltage signal based on a time difference of the second point of time and the first point of time.
(2) The time-of-flight sensing circuitry of (1), wherein the predetermined threshold is a function.
(3) The time-of-flight sensing circuitry of anyone of (1) and (2), wherein the first voltage signal is representative of a sampling of a first transfer gate and the second voltage signal is representative of a sampling of a second transfer gate.
(4) The time-of-flight sensing circuitry of anyone of (1) to (3), comprising:

a first comparator configured to compare the first voltage signal and the predetermined threshold;
   a first clock associated with the first comparator, such that the first point of time is determined based on the comparison of the first voltage signal and the predetermined threshold;
   a second comparator configured to compare the second voltage signal and the predetermined threshold,
   a second clock associated with the second comparator, such that the second point of time is determined based on the comparison of the second voltage signal and the predetermined threshold.
(5) The time-of-flight sensing circuitry of anyone of (1) to (4), wherein the voltage difference is determined for the first point of time.
(6) The time-of-flight sensing circuitry of (5), wherein the voltage difference is further determined based on an extrapolation of the second voltage signal at the second point of time, thereby determining a value of the second voltage signal at the first point of time.
(7) The time-of-flight sensing circuitry of anyone of (1) to (6), wherein the voltage difference is based on the formula:

$$V = V_{threshold}\left(1 - \frac{t_1}{t_2}\right),$$

wherein V is the voltage difference, $V_{threshold}$ is a voltage level at the predetermined threshold, $t_1$ is the first point of time and $t_2$ is the second point of time.
(8) A time-of-flight imaging portion, comprising:
   a time-of-flight signaling circuitry including a first transfer gate and a second transfer gate; and
   a time-of-flight sensing circuitry configured to:
   determine a first point of time, at which a first voltage signal reaches a predetermined threshold;
   determine a second point of time, at which a second voltage signal reaches the predetermined threshold; and
   determine a phase shift of detected light on the basis of a voltage difference between the first and the second voltage signal based on a time difference of the second point of time and the first point of time.
(9) The time-of-flight imaging portion of (8), wherein the predetermined threshold is a function.
(10) The time-of-flight imaging portion of anyone of (8) and (9), wherein the first voltage signal is generated in response to a sampling of the first transfer gate and the second voltage signal is generated in response to a sampling of the second transfer gate.
(11) The time-of-flight imaging portion of anyone of (8) to (10), wherein the voltage difference is determined for the first point of time.
(12) The time-of-flight imaging portion of (11), wherein the voltage difference is further determined based on an extrapolation of the second voltage signal at the second point of time, thereby determining a voltage of the second voltage signal at the first point of time.
(13) The time-of-flight imaging portion of anyone of (8) to (12), wherein one time-of-flight signaling circuitry is associated with one time-of-flight sensing circuitry.
(14) A signal processing method comprising:
   determining a first point of time, at which a first voltage signal reaches a predetermined threshold;

determining a second point of time, at which a second voltage signal reaches the predetermined threshold; and determining a phase shift of detected light on the basis of a voltage difference between the first and the second voltage signal based on a time difference of the second point of time and the first point of time.

(15) The signal processing method of (14), wherein the predetermined threshold is a function.

(16) The signal processing method of anyone of (14) and (15), wherein the first voltage signal is representative of a sampling of a first transfer gate and the second voltage signal is representative of a sampling of a second transfer gate.

(17) The signal processing method of anyone of (14) to (16), further comprising:

comparing the first voltage signal and the predetermined threshold;

determining the first point of time based on the comparison of the first voltage signal and the predetermined threshold;

comparing the second voltage signal and the predetermined threshold; and determining the second point of time based on the comparison of the second voltage signal and predetermined threshold.

(18) The signal processing method of anyone of (14) to (17), wherein the voltage difference is determined for the first point of time.

(19) The signal processing method of (18), further comprising:

extrapolating the second voltage signal at the second point of time; and thereby determining a value of the second voltage signal at the first point of time.

(20) The signal processing method of anyone of (14) to (19), wherein the voltage difference is based on the formula:

$$V = V_{threshold}\left(1 - \frac{t_1}{t_2}\right),$$

wherein V is the voltage difference, $V_{threshold}$ is a voltage level at the predetermined threshold, $t_1$ is the first point of time and $t_2$ is the second point of time.

(21) A computer program comprising program code causing a computer to perform the method according to anyone of (14) to (20), when being carried out on a computer.

(22) A non-transitory computer-readable recording medium that stores therein a computer program product, which, when executed by a processor, causes the method according to anyone of (14) to (20) to be performed.

The invention claimed is:

1. A time-of-flight sensing circuitry comprising:

a first circuit configured to determine a first point of time, at which a first voltage signal reaches a predetermined threshold;

a second circuit configured to determine a second point of time, at which a second voltage signal reaches the predetermined threshold; and a third circuit configured to determine a phase shift of detected light on the basis of a voltage difference between a value of the first voltage signal at the first point of time and a value of the second voltage signal at the first point of time, wherein the voltage difference is based on a time difference between the second point of time and the first point of time.

2. The time-of-flight sensing circuitry of claim 1, wherein the predetermined threshold is a function.

3. The time-of-flight sensing circuitry of claim 1, wherein the first voltage signal is representative of a sampling of a first transfer gate and the second voltage signal is representative of a sampling of a second transfer gate.

4. The time-of-flight sensing circuitry of claim 1, comprising:

a first comparator configured to compare the first voltage signal and the predetermined threshold;

a first clock associated with the first comparator, such that the first point of time is determined based on the comparison of the first voltage signal and the predetermined threshold;

a second comparator configured to compare the second voltage signal and the predetermined threshold, a second clock associated with the second comparator, such that the second point of time is determined based on the comparison of the second voltage signal and the predetermined threshold.

5. The time-of-flight sensing circuitry of claim 1, wherein the voltage difference is determined for the first point of time.

6. The time-of-flight sensing circuitry of claim 5, wherein the voltage difference is further determined based on an extrapolation of the second voltage signal at the second point of time, thereby determining the value of the second voltage signal at the first point of time.

7. The time-of-flight sensing circuitry of claim 1, wherein the voltage difference is based on the formula:

$$V = V_{threshold}\left(1 - \frac{t_1}{t_2}\right),$$

wherein V is the voltage difference, $V_{threshold}$ is a voltage level at the predetermined threshold, $t_1$ is the first point of time and $t_2$ is the second point of time.

8. A time-of-flight imaging portion, comprising:

a time-of-flight signaling circuitry including a first transfer gate and a second transfer gate; and a time-of-flight sensing circuitry configured to:

determine a first point of time, at which a first voltage signal reaches a predetermined threshold;

determine a second point of time, at which a second voltage signal reaches the predetermined threshold; and determine a phase shift of detected light on the basis of a voltage difference between a value of the first voltage signal at the first point of time and a value of the second voltage signal at the first point of time, wherein the voltage difference is based on a time difference between the second point of time and the first point of time.

9. The time-of-flight imaging portion of claim 8, wherein the predetermined threshold is a function.

10. The time-of-flight imaging portion of claim 8, wherein the first voltage signal is generated in response to a sampling of the first transfer gate and the second voltage signal is generated in response to a sampling of the second transfer gate.

11. The time-of-flight imaging portion of claim 8, wherein the voltage difference is determined for the first point of time.

12. The time-of-flight imaging portion of claim 11, wherein the voltage difference is further determined based on an extrapolation of the second voltage signal at the second point of time, thereby determining the value of the second voltage signal at the first point of time.

13. The time-of-flight imaging portion of claim 8, wherein one time-of-flight signaling circuitry is associated with one time-of-flight sensing circuitry.

14. A signal processing method comprising:
determining a first point of time, at which a first voltage signal reaches a predetermined threshold;
determining a second point of time, at which a second voltage signal reaches the predetermined threshold; and
determining a phase shift of detected light on the basis of a voltage difference between a value of the first voltage signal at the first point of time and a value of the second voltage signal at the first point of time, wherein the voltage difference is based on a time difference between the second point of time and the first point of time.

15. The signal processing method of claim 14, wherein the predetermined threshold is a function.

16. The signal processing method of claim 14, wherein the first voltage signal is representative of a sampling of a first transfer gate and the second voltage signal is representative of a sampling of a second transfer gate.

17. The signal processing method of claim 14, further comprising:

comparing the first voltage signal and the predetermined threshold;
determining the first point of time based on the comparison of the first voltage signal and the predetermined threshold;
comparing the second voltage signal and the predetermined threshold; and
determining the second point of time based on the comparison of the second voltage signal and predetermined threshold.

18. The signal processing method of claim 14, wherein the voltage difference is determined for the first point of time.

19. The signal processing method of claim 18, further comprising:
extrapolating the second voltage signal at the second point of time; and thereby
determining the value of the second voltage signal at the first point of time.

20. The signal processing method of claim 14, wherein the voltage difference is based on the formula:

$$V = V_{threshold}\left(1 - \frac{t_1}{t_2}\right),$$

wherein V is the voltage difference, $V_{threshold}$ is a voltage level at the predetermined threshold, $t_1$ is the first point of time and $t_2$ is the second point of time.

* * * * *